United States Patent
Banerjee et al.

(10) Patent No.: US 10,142,284 B2
(45) Date of Patent: Nov. 27, 2018

(54) FASTER IP ADDRESS ALLOCATION IN A HYBRID CLOUD ENVIRONMENT USING SUBNET SELECTIVE RANDOMIZATION

(71) Applicant: VMWARE, INC., Palo Alto, CA (US)

(72) Inventors: Sujeet Banerjee, Bangalore (IN);
Sureshbabu Koyadan Chathoth, Bangalore (IN); Anirudh Agarwal, Bangalore (IN); Amarjeet Singh, Bangalore (IN); Kiran Kumar Cherivirala, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 207 days.

(21) Appl. No.: 14/993,112

(22) Filed: Jan. 12, 2016

(65) Prior Publication Data
US 2017/0093790 A1    Mar. 30, 2017

(30) Foreign Application Priority Data
Sep. 30, 2015 (IN) .......................... 5231/CHE/2015

(51) Int. Cl.
*G06F 15/177* (2006.01)
*H04L 29/12* (2006.01)
*H04L 29/08* (2006.01)

(52) U.S. Cl.
CPC ...... *H04L 61/2007* (2013.01); *H04L 61/2061* (2013.01); *H04L 61/6068* (2013.01); *H04L 67/10* (2013.01)

(58) Field of Classification Search
CPC ............. H04L 61/2007; H04L 61/2061; H04L 61/6068; H04L 67/10

USPC .................................................. 709/220–222
See application file for complete search history.

(56) References Cited

U.S. PATENT DOCUMENTS

| | | | |
|---|---|---|---|
| 8,683,023 B1* | 3/2014 | Brandwine | H04L 45/64 709/220 |
| 2014/0082164 A1* | 3/2014 | Niemoller | H04L 61/2007 709/221 |
| 2015/0180824 A1* | 6/2015 | Atanasov | H04L 61/2015 709/224 |
| 2015/0289505 A1* | 10/2015 | Jin | A01N 35/06 504/105 |
| 2016/0105393 A1* | 4/2016 | Thakkar | H04L 41/0823 709/220 |

(Continued)

OTHER PUBLICATIONS

J. Mogul et al. "Internet Standard Subnetting Procedure"; https://www.ietf.org/rfc/rfc950.txt; Aug. 1985, 18 pages.

*Primary Examiner* — Phuoc H Nguyen
(74) *Attorney, Agent, or Firm* — Loza & Loza, LLP (57) ABSTRACT

Multiple tenants within a hybrid cloud computing system may need IP addresses to communicate over a computer network external to the hybrid cloud system (such as the Internet). IP addresses are a scarce resource, and each address can only be assigned to a single tenant. With multiple tenants competing for IP addresses, many request collisions may occur if tenants request IP addresses in a naïve manner, such as by requesting the next available IP address numerically. When a collision occurs, a tenant must request a different IP address. Instead, tenants request random IP addresses within a particular subnet in a random manner, thereby reducing the number of collisions that occur and improving the latency associated with requesting an IP address.

20 Claims, 5 Drawing Sheets

(56) References Cited

U.S. PATENT DOCUMENTS

2016/0344687 A1* 11/2016 Rong ................... H04L 61/2015
2016/0373405 A1* 12/2016 Miller ................. H04L 63/0236

* cited by examiner

FASTER IP ADDRESS ALLOCATION IN A HYBRID CLOUD ENVIRONMENT USING SUBNET SELECTIVE RANDOMIZATION

RELATED APPLICATIONS

Benefit is claimed under 35 U.S.C. 119(a)-(d) to Foreign application Serial No. 5231/CHE/2015 filed in India entitled "FASTER IP ADDRESS ALLOCATION IN A HYBRID CLOUD ENVIRONMENT USING SUBNET SELECTIVE RANDOMIZATION", on Sep. 30, 2015, by VMware, Inc., which is herein incorporated in its entirety by reference for all purposes.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks.

Cloud architectures typically maintain a pool of available IP (Internet Protocol) addresses that may be used to communicate with the "outside world" (e.g., via a global or wide ranging computer network such as the Internet). An inefficient scheme for assigning IP addresses to tenants may result in poor performance.

SUMMARY

Embodiments of the present disclosure provide a method for allocating IP addresses. The method includes identifying, by a first gateway operating within a first cloud computing environment, a current subnet that includes at least one available IP address for allocation from a global pool of IP addresses that is in communication with the first gateway and a second gateway operating within a second cloud computing environment that is securely separate from the first cloud computing environment. The method also includes randomly selecting an available IP address from the current subnet for allocation. The method further includes requesting allocation of the available IP address from the global pool of IP addresses.

Further embodiments include a non-transitory computer-readable storage medium storing instructions that cause a computer to carry out the above method and a system.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
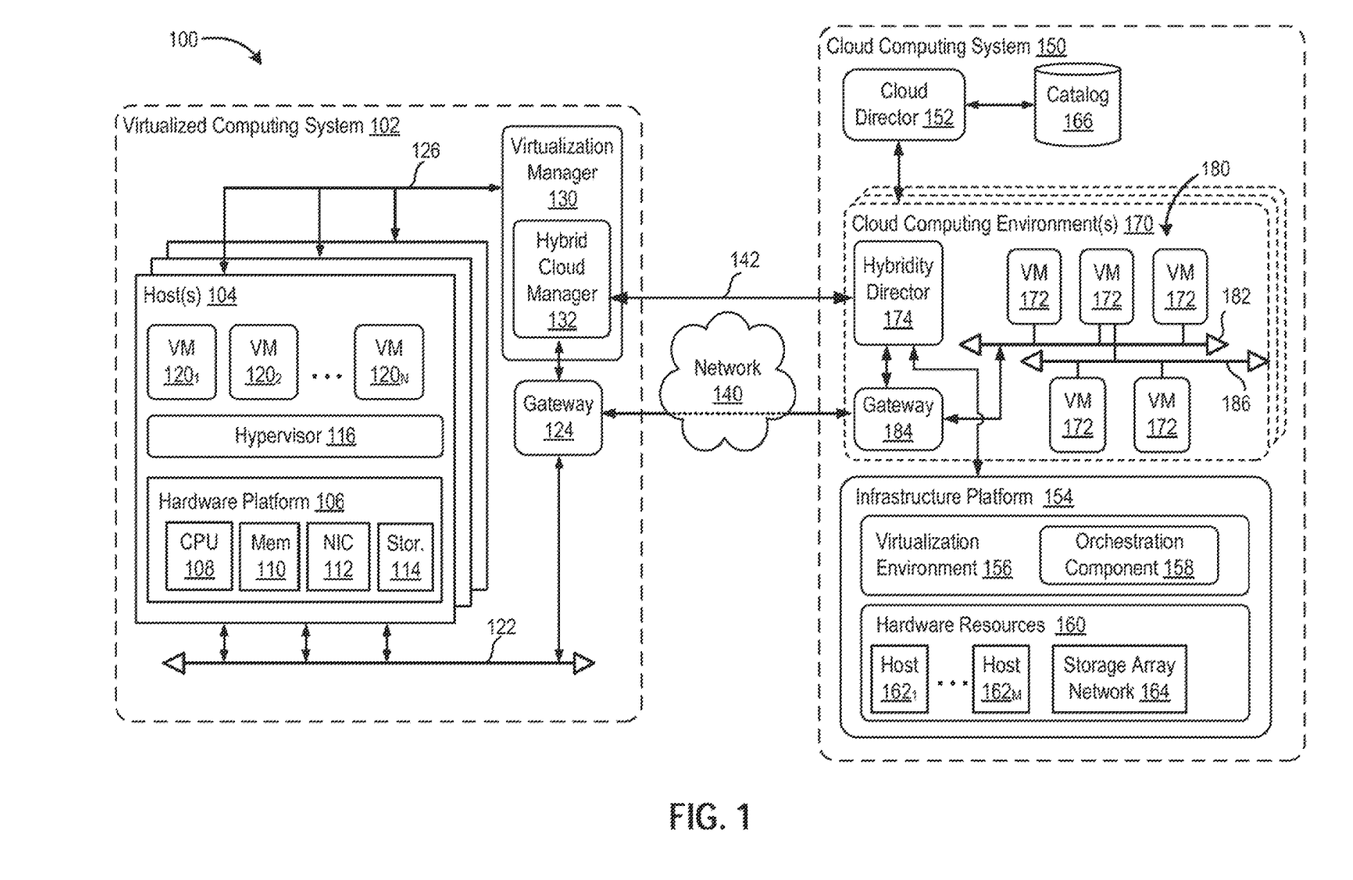
FIG. 1 is a block diagram that illustrates a computer system in which one or more embodiments may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter™ Server product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtual computing resources provided by cloud computing system 150 with virtual computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120 and route traffic incoming to and outgoing from virtualized computing system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 180 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtual computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagate such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct instantiated and managed by a tenant that provides compute, network, and storage resources to that tenant. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., cloud gateway 184), as well as one or more isolated internal networks 186 not connected to cloud gateway 184. Cloud gateway 184 (e.g., executing as a virtual appliance) is configured to provide VMs 172 and other components in cloud computing environment 170 with connectivity to external network 140 (e.g., Internet). Cloud gateway 184 manages external public IP addresses for virtual data center 180 and one or more private internal networks interconnecting VMs 172. Cloud gateway 184 is configured to route traffic incoming to and outgoing from virtual data center 180 and provide networking services, such as firewalls, network address translation (NAT), dynamic host configuration protocol (DHCP), and load balancing. Cloud gateway 184 may be configured to provide virtual private network (VPN) connectivity over a network 140 with another VPN endpoint, such as a gateway 124 within virtualized computing system 102. In other embodiments, cloud gateway 184 may be configured to connect to communicate with virtualized computing system 102 using a high-throughput, dedicated link (depicted as a direct connect 142) between virtualized computing system 102 and cloud computing system 150. In one or more embodiments, gateway 124 and cloud gateway 184 are configured to provide a "stretched" layer-2 (L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

Although not shown in FIG. 1, cloud computing system 150 may support multiple tenants. Accordingly, hybridity director 174 is configured to enable separate, tenant-specific virtualized computing platforms between each virtualized computing system 102 and cloud computing system 150, while maintaining secure separation between tenants. Hybridity director 174 may employ any technically feasible security and separation measures to implement secure separation. For instance, in some embodiments, hybridity director 174 coordinates access control, virtual local area network (VLAN) segmentation, and virtual storage controllers to enforce secure separation. As used herein, tenants may represent unique customers, independently maintained on-premises virtualized computing systems 102 that are associated with a single customer, or any combination thereof. Tenants may interact with tenant-facing software components implemented within VMs 172 or other components of cloud computing environments 180.

For a given tenant, virtualization manager 130 performs on-premises management tasks to support virtualized computing system 102 internally, independently of virtualization managers 130 of other tenants. Such tasks may include provisioning VMs 120, migrating VMs 120 between hosts 104, and allocating physical resources, such as CPU 108 and memory 110.

Further, for a given tenant, hybrid cloud manager 132 performs cross-cloud management tasks, such as deploying VMs in cloud computing system 150, and migrating VMs from virtualized computing system 102 to cloud computing system 150. Such cross-cloud management tasks involve interaction with a corresponding hybrid cloud manager 132 of a given tenant, and therefore such operations are sometimes referred as "tenant-facing" operations.

Figure 2:
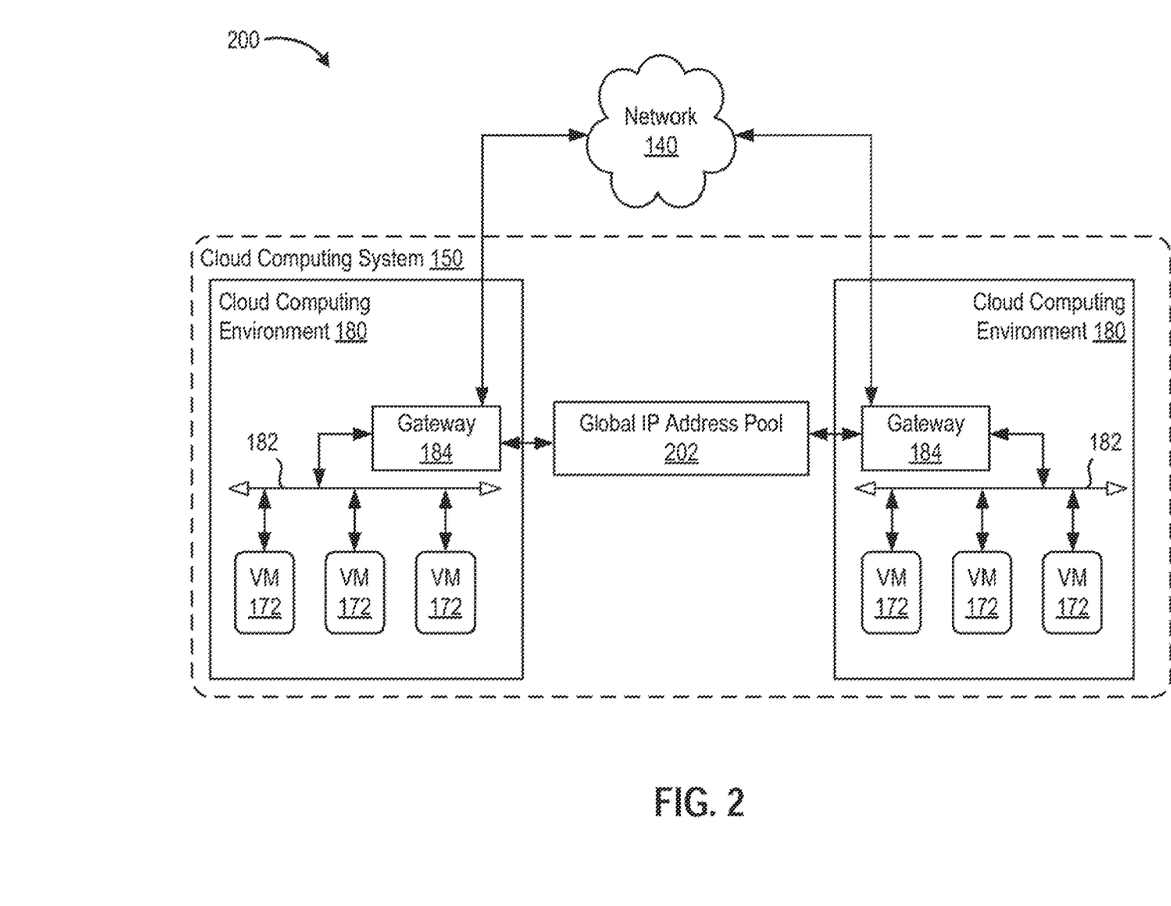
FIG. 2 is a block diagram of an IP address allocation system, according to an example.

FIG. 2 is a block diagram of an IP address allocation system 200, according to an example. As shown, the allocation system 200 includes cloud computing system 150, which includes multiple cloud computing environments 180. Each cloud computing environment 180 includes the components shown in FIG. 1. For clarity, some of these components are not illustrated in FIG. 2. Gateways 184, VMs 172, and virtual networks 182 are shown in FIG. 2.

As described above, VMs 172 are connected via virtual network 182, which provides a communication path to an external network such as network 140. Network 140 is external to cloud computing system 150 and may be, for example, a broad, public computer network such as a wide area network or a global computing network, such as the Internet. As also described above, each cloud computing environment 180 is used by a different tenant, and cloud computing environments 180 are securely separate, meaning that tenants do not have access to data associated with other tenants.

At any particular time, gateways 184 are assigned a certain number of IP addresses for use by VMs 172 to communicate via external network 140. Such IP addresses are used in IP routing, to identify the source of communications as well as a reply destination. These IP addresses may be used to communicate with a computer network that is external from cloud computing system 150, such as the Internet, a wide area network, or some other type of computer network. These IP addresses are "public" IP addresses and are therefore considered to be a "scarce" resource. The IP addresses assigned to a particular gateway 184 associated with a particular cloud computing environment 180 are limited. If a particular tenant wishes to use additional IP addresses, the tenant requests that gateway 184 obtain additional IP addresses and gateway 184 requests those IP addresses from global IP address pool 202.

Global IP address pool 202 is a data structure that lists IP addresses accessible to cloud computing system 150. Global IP address pool 202 may be stored in any storage device included in the hybrid cloud computing system 100 and may be managed by one or more hosts 104, hosts 162, or other computing resources within hybrid cloud computing system 100. These IP addresses may be made available from an organization that manages such IP addresses. Cloud computing system 150 is assigned a limited number of IP addresses for distribution among all cloud computing environments 180. Global IP address pool 202 stores indications of which IP addresses are used by which cloud computing environment 180 and which IP addresses are available for allocation to a cloud computing environment 180.

When a gateway 184 wishes to acquire new IP addresses from global IP address pool 202, gateway 184 examines global IP address pool 202 to identify which IP addresses are available and subsequently requests one of the available IP addresses. If two or more gateways concurrently request the same IP address from global IP address pool 202, all but one such request will fail. This is because, to ensure that IP addresses are not assigned to multiple different tenants, gateways 184 obtain IP addresses from global IP address pool 202 by modifying the data structure atomically. Thus, if a gateway 184 requests a particular IP address, but that IP address has already been claimed by a different gateway 184, then the request for that IP address will fail. Note that because different cloud computing environments 180 (and tenants) are securely separate and thus independent, different gateways 184 do not coordinate in selecting IP addresses from global IP address pool 202. However, different gateways 184 may experience a conflict if two or more gateways attempt to allocate the same IP address from global IP address pool 202 at approximately the same time.

After an IP address allocation request fails, gateway 184 retries for a new IP address in global IP address pool 202. In some approaches, gateways 184 try for the numerically next available IP address in the same subnet as the IP address for which allocation failed. Such a scheme, however, may result in multiple failures, and thus a large delay associated with obtaining new IP addresses, if multiple gateways attempt to obtain a new IP address at the same time.

Thus, in one or more embodiments, gateways 184 request numerically random IP addresses from a "current" subnet within global IP address pool 202. In other words, gateways 184 randomly select an IP address within a "current" subnet. A subnet is a logical division of an IP network, represented as a set of IP addresses that have the same prefix. For example, a subnet may have the same three (out of four) initial address numbers (e.g., 10.1.1.X). Global IP address pool 202 may include IP addresses of different subnets. The "current" subnet is the subnet from which IP address assignment is currently being done and may be a partially empty subnet. If a "current" subnet no longer has available IP addresses, a next subnet may be selected as the current subnet. Gateways 184 independently decide which subnet is the "current" subnet, but because these decisions are based on which IP addresses are available in global IP address pool 202, it is expected that each gateway 184 will be in approximate agreement about which subnet is the current subnet. More specifically, gateways 184 sometimes interact with global IP address pool 202, requesting updates regarding which IP addresses are available and which are unavailable. Gateways 184 may store this information in independently maintained internal lists of available IPs 302, using this list to identify an available IP address to obtain. Because of this common interaction with global IP address pool 202, it is likely that, at any particular time, different gateways 184 will be in agreement about what IP addresses are available. In some embodiments, selection of a next subnet is done in a numerically sequential manner. More specifically, each subnet is identified by a specific IP address prefix (such as 150.5.3.X, where "X" can be any integer from 0 to 255). Global IP address pool 202 may have IP addresses from sequential subnets (e.g., 150.5.3.X and 150.5.4.X) or even from non-sequential subnets (e.g., 150.5.3.X and 190.56.1.X). When referring to subnets in global IP address pool 202, the term "numerically sequential" or "numerically subsequent" refers to a numerically next available subnet prefix. Thus, for example, if all IP addresses from a subnet are allocated to gateways 184 so that a next subnet is to be chosen, gateways 184 may select such a next subnet as the numerically subsequent subnet, meaning that a subnet is chosen having the next-highest prefix number as compared with the subnet from which all IP addresses were just allocated. Note that gateways can request multiple different IP addresses in parallel, attempting to obtain locks on the different IP addresses and, if successful, obtaining the requested IP addresses. Note that each tenant may be associated with a single gateway 184 or with multiple gateways 184. In some embodiments, different gateway may operate independently and thus may select IP addresses for allocation independently, regardless of whether the gateways are operating for a single tenant and/or for a single cloud computing environment 170.

Figure 3:
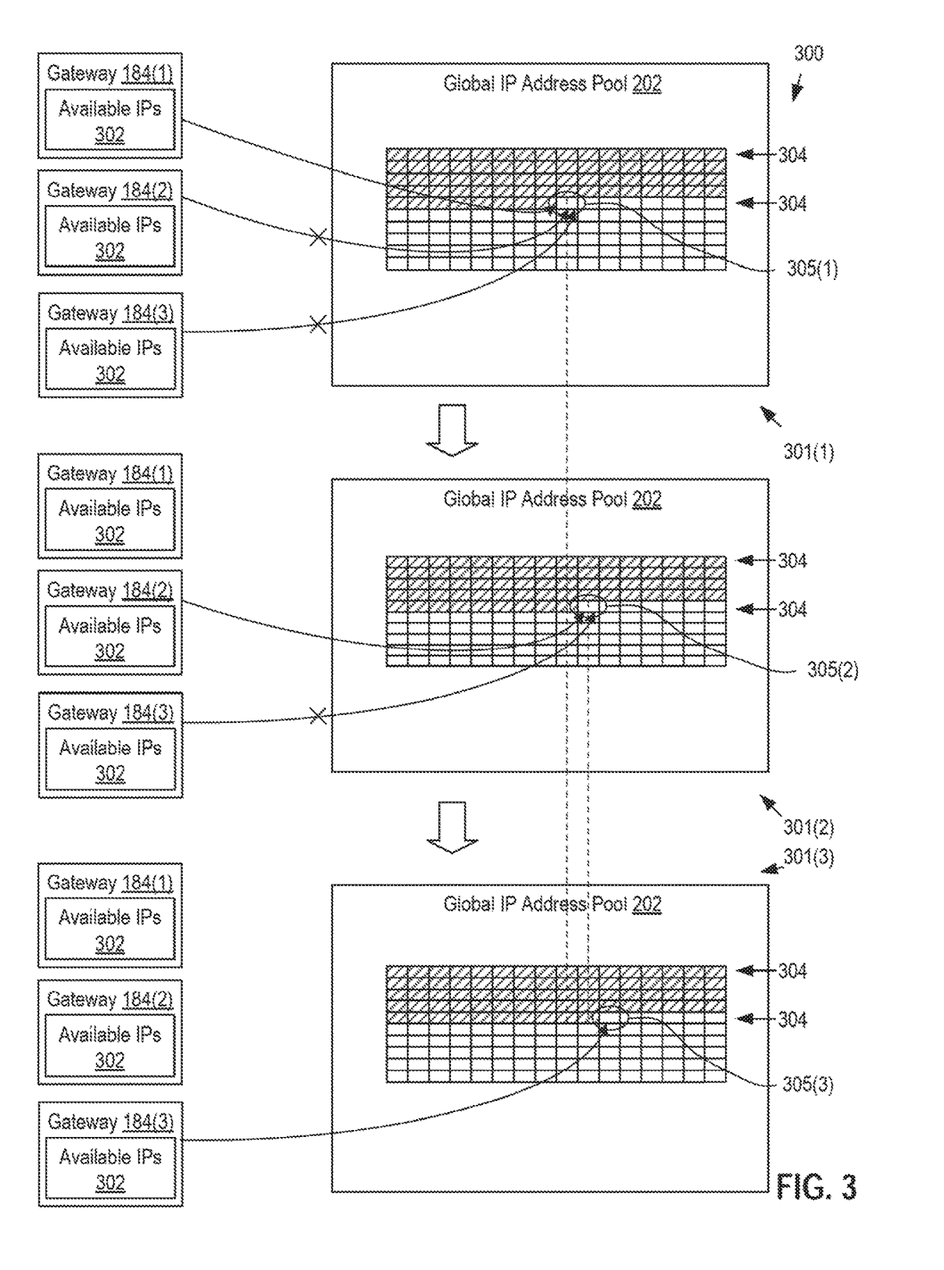
FIG. 3 is a diagram illustrating a technique for requesting IP addresses from a global IP address pool, according to an example.
Figure 4:
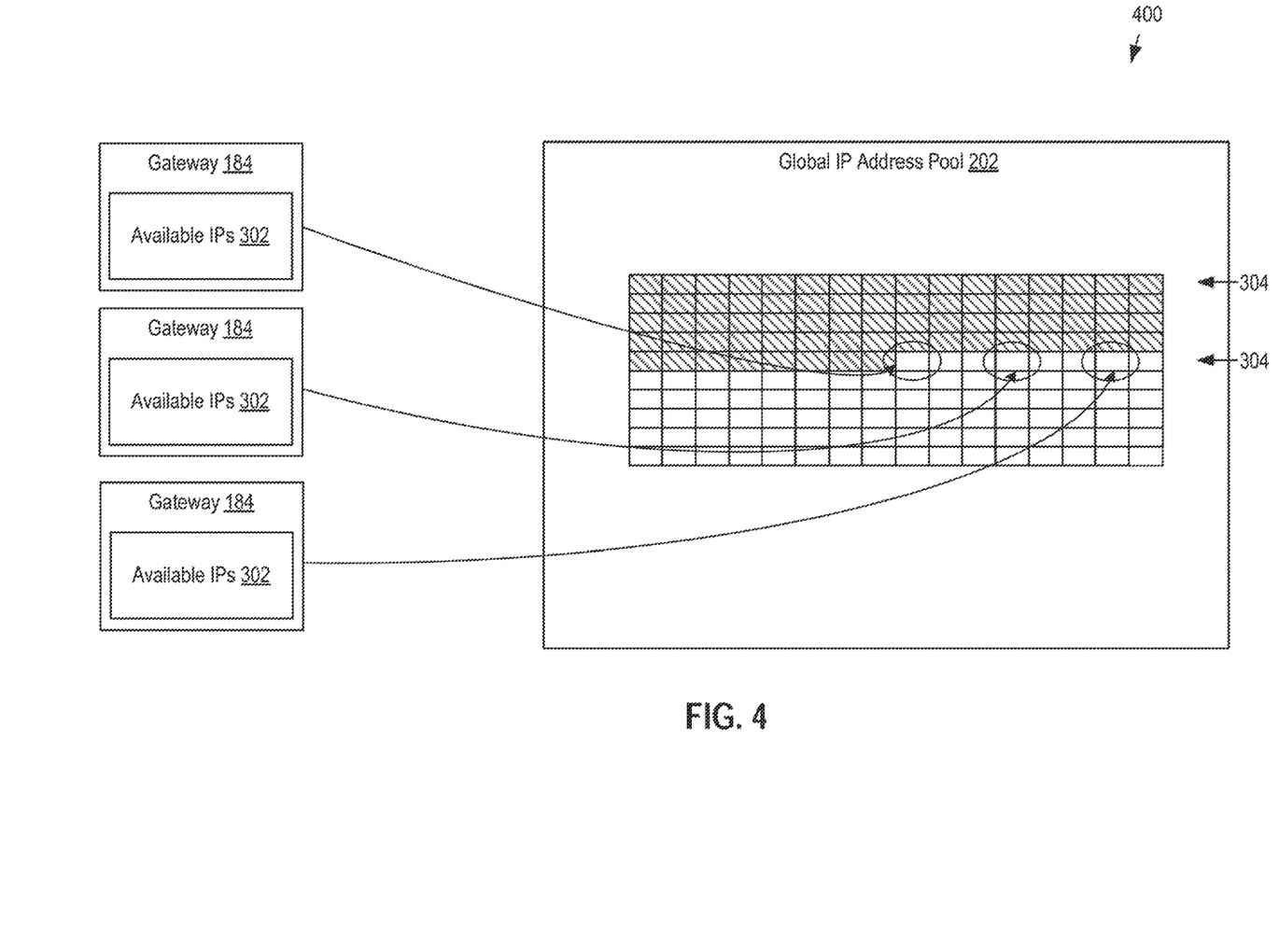
FIG. 4 is a diagram illustrating a technique for requesting IP addresses from a global IP address pool, according to another example.

FIGS. 3 and 4 illustrate the different techniques for requesting new IP addresses from global IP address pool 202. FIG. 3 illustrates a technique in which gateways 184 request sequentially numbered IP addresses from within a "current" subnet. FIG. 4 illustrates a technique in which gateways 184 request randomly numbered IP addresses from the "current" subnet.

FIG. 3 is a diagram 300 illustrating a technique for requesting IP addresses from a global IP address pool 202, according to an example. Diagram 300 illustrates three states, separated by arrows, where the states represent different times at which gateways 184 are attempting to obtain an IP address from global IP address pool 202. Note that the pool of IP addresses 202 is separated into subnets 304 of IP addresses, where the IP addresses are represented by boxes and where each row is a different subnet. Note also that for clarity, only some subnets are marked with a reference number (304), but that each row of boxes is a different subnet that could be referred to with reference number 304. Shaded boxes represent IP addresses that are unavailable and unshaded boxes represent IP addresses that are available. Note also that although subnets appear to be of equal size in FIG. 3, subnets may be of different sizes.

In the first state 301(1) each of three different gateways 184 are attempting to obtain the same IP address—the IP address that is highlighted with the oval 305(1) indicator. Gateways 184 are all attempting to obtain that IP address because their internal list of available IPs 302 indicates that that IP address is the numerically next available IP address in the current subnet 304. As described above, the internal list of available IPs 302 stores indications of IP addresses within global IP address pool 202 that are available. To ensure that two different gateways 184 do not obtain the same IP address, each gateway 184 attempts to obtain IP addresses from global IP address pool 202 in a thread-safe manner, obtaining a lock or the like on the attempted IP address. In some embodiments, for a gateway 184 to obtain an IP address, the gateway would attempt to obtain a synchronization lock on the IP address. Once the synchronization lock is obtained, the gateway would mark the IP address as allocated (or otherwise indicate that the IP address is allocated to the gateway) and would then release the lock. A gateway 184 that subsequently examines the global IP address pool would see that the IP address is now allocated. Note that if two gateways attempt to "simultaneously" obtain the IP address, only one of the gateways will succeed. This is because the act of obtaining the lock is atomic. Only one gateway is permitted to obtain a lock on the IP address to be allocated. If, while the lock is obtained for one gateway, another gateway attempts to obtain the lock, then that gateway will fail to obtain the lock and will determine that the IP address cannot be obtained.

Because IP addresses are accessed in a thread-safe manner, only one gateway will be able to acquire the requested IP address while the other gateways will fail. In FIG. 3, the successful gateway is the top-most gateway 184(1) and gateway 184(2) and gateway 184(3) fail, which is indicated by X's.

After the two gateways fail, they both retry to obtain a new IP address, selecting the numerically subsequent IP address from within the same subnet. Both gateways "believe" that the same IP address is available and both try for the same IP address. One gateway fails since only one gateway is able to obtain the IP address.

After one of the gateways fail, the last gateway attempts to obtain the numerically subsequent IP address in the subnet, and is successful since only one gateway is attempting to obtain that IP address. Note that because gateways 184 attempt to obtain the same IP address, the latency between initially trying to obtain a new IP address and actually being assigned an IP address may be very high. In a worst case scenario, the longest latency will be equal to the amount of time required for requesting and obtaining an IP address without failure multiplied by the number of gateways attempting to obtain the IP address.

Figure 5:
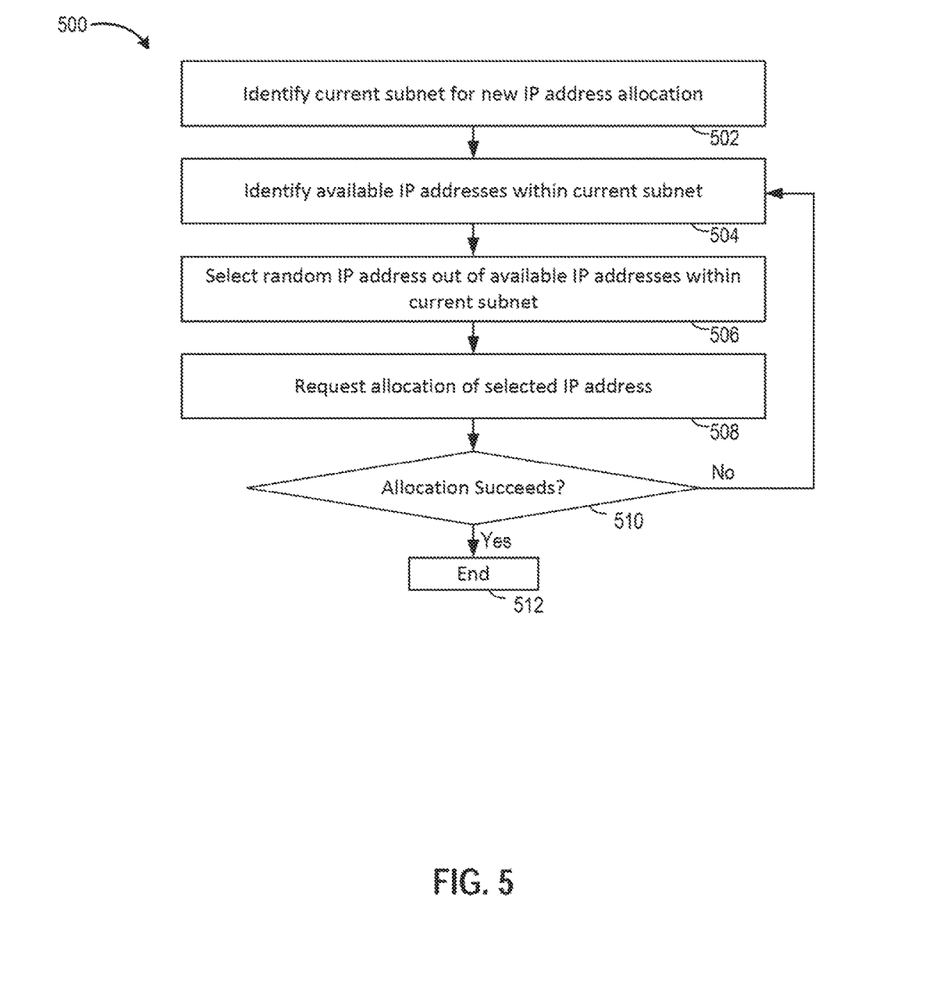
FIG. 5 is a flow diagram of a method for allocating an IP address, according to an example.

FIGS. 4 and 5 will now be discussed together. FIG. 4 is a diagram 400 illustrating a technique for requesting IP addresses from a global IP address pool 202, according to another example. FIG. 5 is a flow diagram of a method 500 for allocating an IP address to a gateway 184 in a multi-tenant cloud-based system, according to an example. Although described with respect to the system of FIGS. 1-2, it should be understood that any system that performs the method, in various technically feasible orders, falls within the scope of the present disclosure.

As shown, method 500 begins at step 502, where gateway 184 identifies a current subnet for new IP address allocation. This subnet is a subnet that includes one or more available IP addresses. Gateway 184 may identify the current subnet based on an internal list of available IPs 302. Specifically, gateway 184 may identify the current subnet as a subnet that includes at least some available IPs.

At step 504, gateway 184 identifies available IP addresses within the current subnet. Gateway 184 may request updated information from global IP address pool 202 regarding which IP addresses are available and store that information in a local list of available IP addresses 302. Gateway 184 may use that information to identify an available IP address.

At step 506, gateway 184 selects, out of the available IP addresses within the current subnet, a random IP address to request. At step 508, gateway 184 requests allocation of the selected IP address. As shown in FIG. 4, instead of requesting IP addresses numerically subsequent to the last taken IP address in the current subnet, gateways 184 request a random IP address of the available IP addresses of the current subnet. In FIG. 4, because of this random selection, there are no conflicts between different gateways 184. Thus, each gateway experiences the same, low amount of latency. Note that in other examples, two gateways might choose the same IP address, but the random selection of IP addresses reduces the chance of such conflict occurring.

Note that the IP addresses are randomly selected from within a single subnet, rather than from the entire global IP address pool 202. The subnet from which the IP addresses are requested is the subnet from which IP addresses are currently being assigned—the "current" subnet. The current subnet might be a subnet from which some but not all IP addresses have been assigned. Global IP address pool 202 and/or gateway 184 may store an indication of which subnet is the current subnet. Once the current subnet has no more available IP addresses, gateways 184 switch to a new subnet with available IP addresses. In some embodiments, this new subnet is the numerically subsequent subnet from the previously current subnet. More specifically, each subnet is identified by a specific IP address prefix (such as 150.5.3.X, where "X" can be any integer from 0 to 255). Global IP address pool 202 may have IP addresses from sequential subnets (e.g., 150.5.3.X and 150.5.4.X) or even from non-sequential subnets (e.g., 150.5.3.X and 190.56.1.X). When referring to subnets in global IP address pool 202, the term "numerically sequential" or "numerically subsequent" refers to a numerically next available subnet prefix. Thus, for example, if all IP addresses from a subnet are allocated to gateways 184 so that a next subnet is to be chosen, gateways 184 may select such a next subnet as the numerically subsequent subnet, meaning that a subnet is chosen having the next-highest prefix number as compared with the subnet from which all IP addresses were just allocated.

In some embodiments, random selection is done by affording each available IP address within the current subnet an equal weight. That is, each available IP address has an equal likelihood of being selected by gateways 184.

Note also that a current subnet may contain fewer available IP addresses than a number of gateways concurrently requesting IP addresses from global IP address pool 202. In that situation, each gateway will nonetheless concurrently request IP addresses from the same subnet and one or more gateways will fail and try again to obtain an available IP address. When all IP addresses from the current subnet are assigned, the current subnet changes (due to each gateway 184 determining that there are no longer any available IP addresses in the current subnet) and gateways 184 request IP addresses from this new current subnet.

Note also that selection of an IP address is done randomly from a current subnet rather than randomly from global IP address pool 202. This is because while selecting randomly from global IP address pool 202 would reduce the number of conflicts between gateways, selecting randomly from global IP address pool 202 would also increase fragmentation of IP addresses and decrease manageability. Thus, selecting randomly from a current subnet represents a tradeoff between performance and manageability.

Referring back to FIG. 5, at step 510, gateway 184 determines whether the allocation succeeds. If the allocation does not succeed (for example, due to a conflict), then method 500 returns to step 504 to identify available IP addresses within the current subnet, which may be done by requesting updated information from global IP address pool 202. Of course, the current subnet may change if all IP addresses from the previous current subnet have been allocated and no such addresses are available any longer. If, at step 510, allocation succeeds, then method 500 proceeds to step 512 and IP address allocation ends.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernels functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. As used herein, the term "container" refers generically to both virtual machines and OS-less containers.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for allocating Internet Protocol (IP) addresses, the method comprising:
identifying, by a first gateway operating within a first cloud computing environment, a current subnet that includes at least one available IP address for allocation from a global pool of IP addresses that is in communication with the first gateway and a second gateway operating within a second cloud computing environment that is securely separate from the first cloud computing environment;
randomly selecting, by the first gateway operating within the first cloud computing environment, an available IP address from the current subnet for allocation;
requesting allocation of the available IP address, by the first gateway operating within the first cloud computing environment, from the global pool of IP addresses; and
responsive to determining that no available IP address exists in the current subnet, selecting, by the first gateway operating within the first cloud computing environment, a new subnet from which to allocate IP addresses.

2. The method of claim 1, further comprising:
responsive to obtaining an indication that the selected IP address cannot be allocated to the first gateway from the global IP address pool, randomly selecting a second available IP address from the current subset and requesting allocation of the second available IP address.

3. The method of claim 2, further comprising:
responsive to obtaining an indication that the selected IP address cannot be allocated to the first gateway from the global IP address pool, identifying a set of available IP addresses in the current subnet.

4. The method of claim 1, further comprising:
randomly selecting a second available IP address from the new subnet, and
wherein selecting the new subnet comprises selecting, from the global IP address pool, a subnet that has a numerically subsequent IP address prefix as compared with the current subset.

5. The method of claim 1, wherein:
the random selection of the available IP address is performed by providing each IP address within the current subnet equal likelihood of being chosen.

6. The method of claim 1, further comprising:
randomly selecting, by the second gateway, a second available IP address in the current subnet associated with the global IP address pool, and
requesting allocation, by the second gateway, of the second available IP address from the global IP address pool.

7. The method of claim 6, wherein:
the random selection, by the second gateway, of the second available IP address, is independent of the random selection, by the first gateway, of the first available IP address.

8. The system of claim 1, wherein:
randomly selecting the available IP address from the current subnet comprises randomly selecting the available IP address by the first gateway, and
the method further comprises:
randomly selecting, by the first gateway, a second available IP address from the current subnet for allocation, and
requesting allocation of the second available IP address from the global pool of IP addresses in a time period that at least partially overlaps with the requesting allocation of the available IP address from the global pool of IP addresses.

9. The method of claim 1, wherein:
requesting allocation of the selected IP address is performed in a thread-safe manner.

10. A system for allocating Internet Protocol (IP) addresses, the system comprising:
a first cloud computing environment including a first processor configured to execute a first gateway;
a second cloud computing environment including a second processor configured to execute a second gateway, wherein the second cloud computing environment is securely separate from the first cloud computing environment;
a storage device storing a global IP address pool that is in communication with the first gateway and the second gateway;
wherein the first gateway is configured to:
identify a current subnet that includes at least one available IP address for allocation from the global pool of IP addresses,
randomly select an available IP address from the current subnet for allocation,
request allocation of the available IP address from the global pool of IP addresses; and
responsive to determining that no available IP address exists in the current subnet, select a new subnet from which to allocate IP addresses.

11. The system of claim 10, wherein the first gateway is further configured to:
responsive to obtaining an indication that the selected IP address cannot be allocated to the first gateway from the global IP address pool, randomly select a second available IP address from the current subnet and request allocation of the second available IP address.

12. The system of claim 11, wherein the first gateway is further configured to:
responsive to obtaining an indication that the selected IP address cannot be allocated to the first gateway from the global IP address pool, identify a set of available IP addresses in a current subnet.

13. The system of claim 10, wherein the first gateway is further configured to:
randomly select a second available IP address from the new subnet, and
wherein the first gateway is further configured to select, from the global IP address pool, a subnet that has a numerically subsequent IP address prefix as compared with the current subset.

14. The system of claim 10, wherein the first gateway is configured to randomly select the available IP address by:
    allocating each IP address within the current subnet an equal likelihood of being chosen.

15. The system of claim 10, wherein the second gateway is configured to:
    randomly select a second available IP address in the current subnet, and
    request allocation of the second available IP address from the global IP address pool.

16. The system of claim 15, wherein:
    the random selection, by the second gateway, of the second available IP address, is independent of the random selection, by the first gateway, of the first available IP address.

17. The system of claim 15, wherein the first gateway is further configured to:
    randomly select a second available IP address from the current subnet for allocation; and
    request allocation of the second available IP address from the global pool of IP addresses in a time period that at least partially overlaps with the requesting allocation of the available IP address from the global pool of IP addresses.

18. The system of claim 10, wherein the first gateway is configured to:
    request allocation of the selected IP address in a thread-safe manner.

19. A non-transitory computer-readable medium storing instructions that, when executed by a processor, cause the processor to perform a method, the method comprising:
    identifying, by a first gateway operating within a first cloud computing environment, a current subnet that includes at least one available IP address for allocation from a global pool of IP addresses that is in communication with the first gateway and a second gateway operating within a second cloud computing environment that is securely separate from the first cloud computing environment;
    randomly selecting, by the first gateway operating within the first cloud computing environment, an available IP address from the current subnet for allocation;
    requesting allocation of the available IP address, by the first gateway operating within the first cloud computing environment, from the global pool of IP addresses; and
    responsive to determining that no available IP address exists in the current subnet, selecting, by the first gateway operating within the first cloud computing environment, a new subnet from which to allocate IP addresses.

20. The non-transitory computer-readable medium of claim 19, wherein the method further comprises:
    responsive to obtaining an indication that the selected IP address cannot be allocated to the first gateway from the global IP address pool, randomly selecting a second available IP address from the current subnet and requesting allocation of the second available IP address.

* * * * *